July 31, 1928.  1,678,693
J. R. EAID
SPRING WHEEL.
Filed June 11, 1923   2 Sheets-Sheet 1

Inventor.
John R. Eaid.
by Parker & Carter
Attorneys

July 31, 1928.
J. R. EAID
SPRING WHEEL
Filed June 11, 1923
1,678,693
2 Sheets-Sheet 2
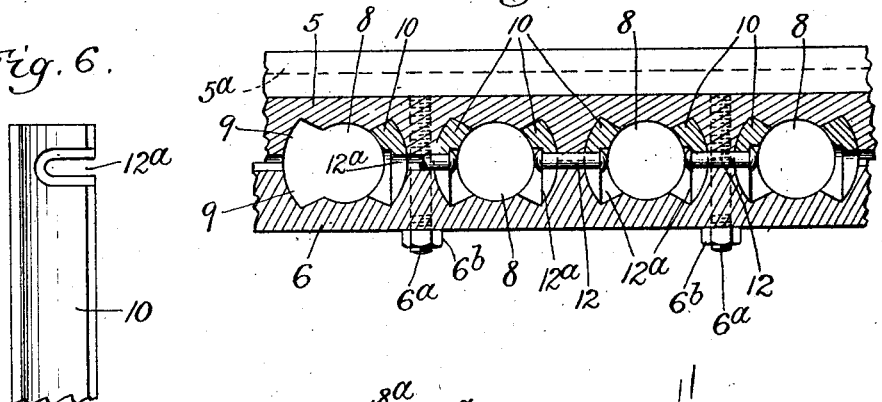
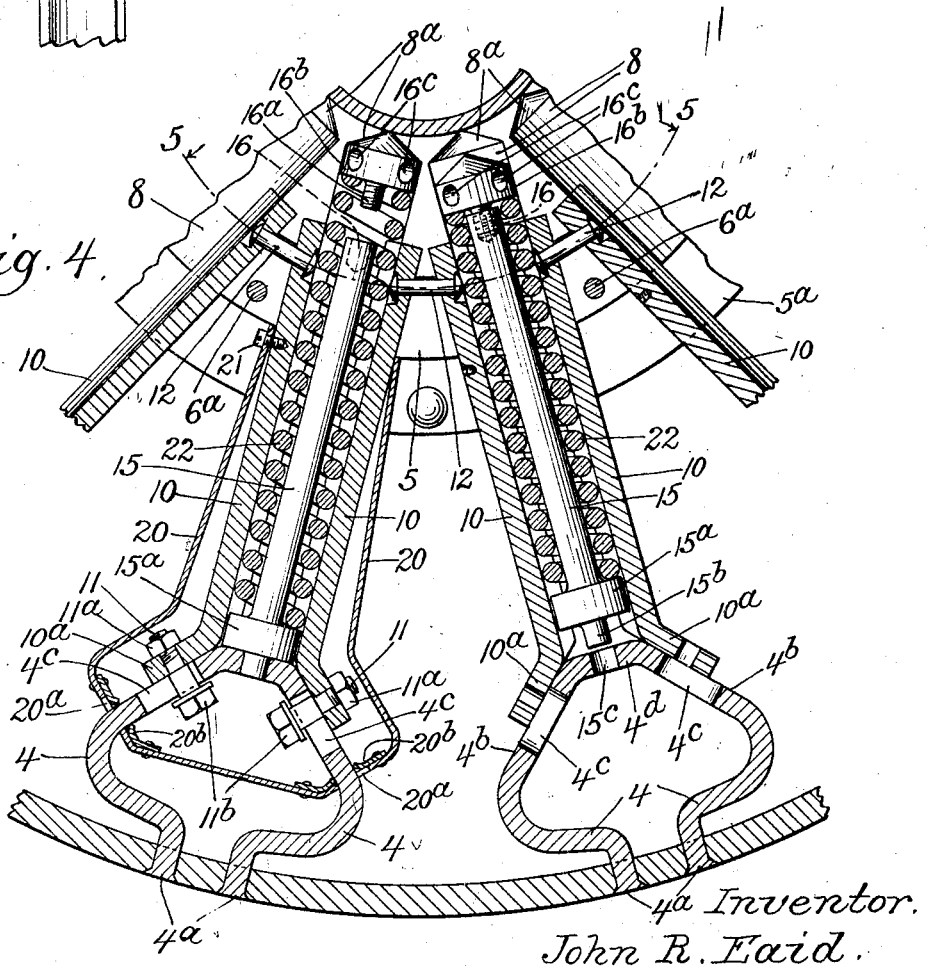
Inventor.
John R. Eaid.
by Parker & Carter
Attorneys.

Patented July 31, 1928.

1,678,693

UNITED STATES PATENT OFFICE.

JOHN R. EAID, OF CHICAGO, ILLINOIS, ASSIGNOR TO THE PEOPLES TRUST AND SAVINGS BANK OF CHICAGO, TRUSTEE.

SPRING WHEEL.

Application filed June 11, 1923. Serial No. 644,578.

This invention relates to improvements in spring wheels and has for its object to provide a wheel which will obviate the necessity of a pneumatic tire and which will be springy and elastic and thus take up the jars to which wheels such as automobile wheels are now subjected when in use. The invention has other objects which are more particularly pointed out in the accompanying description.

Referring now to the drawings:

Fig. 4 is a fragmentary section on line 4—4 of Fig. 2.

Fig. 5 is a section on a line 5—5 of Fig. 4 with parts omitted.

Fig. 6 is a side view of the hub end of one of the spring members of the spokes.

Like numerals refer to like parts throughout the several figures.

Figure 1:
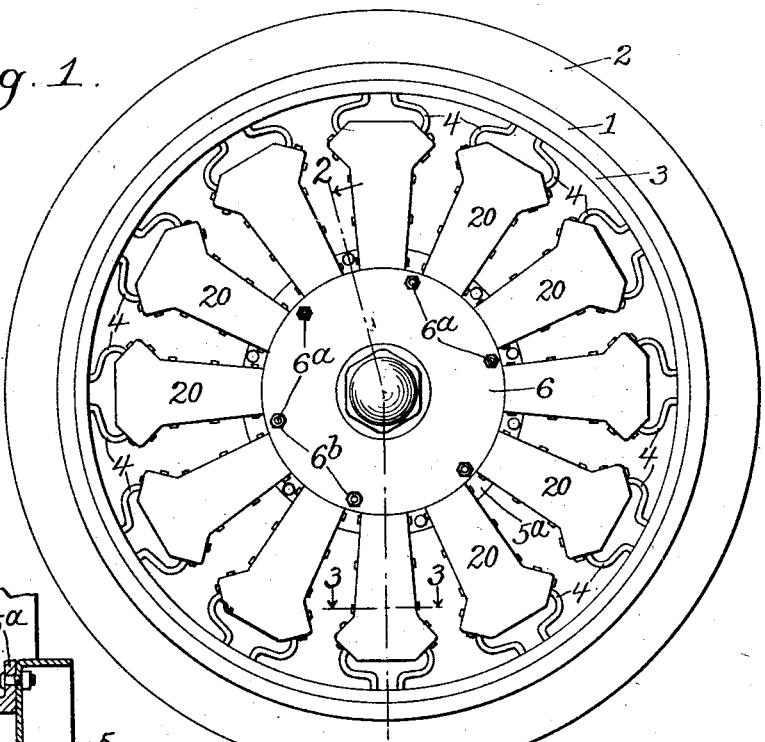
Fig. 1 is a view showing one form of wheel embodying the invention.
Figure 2:
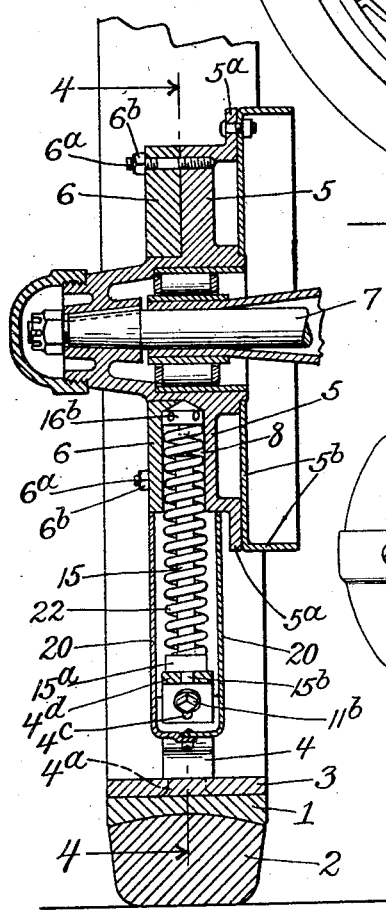
Fig. 2 is an enlarged sectional view taken on the line 2—2 of Fig. 1.
Figure 3:
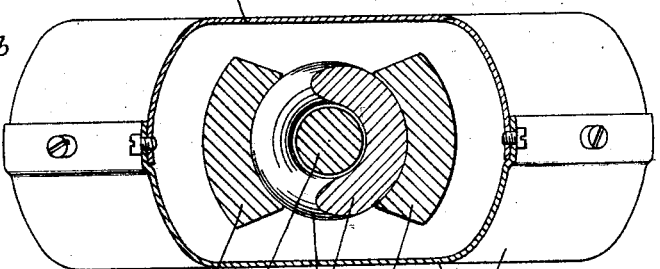
Fig. 3 is a section on the line 3—3 of Fig. 1.

Referring to the drawings above shown, I illustrate a wheel having a rim 1, a solid tire 2 and a felloe 3 to which are secured a plurality of spaced spoke terminals 4 each of which comprises a strip of metal bent upon itself with its two ends secured to the felloe as at 4ª. The terminals are provided with two opposed inclined surfaces 4ᵇ which are longitudinally slotted as at 4ᶜ. Between the inclined surfaces lies a short portion 4ᵈ, roughly concentric with or parallel with the portion of the felloe to which the terminal is secured.

5 is the inner hub plate having a rearwardly and outwardly projecting flange 5ª, to which is secured the brake drum 5ᵇ.

6 is the outer hub plate, adapted to be secured to the inner hub plate 5, for example by the bolts 6ª and nuts 6ᵇ. 7 is any suitable axle structure, the details of which do not form part of the present invention. The opposed hub plates 5 and 6, when joined together form a single hub element in which are a plurality of radial and substantially cylindrical apertures 8, each terminating in a conic bearing surface 8ª.

The inner portions of these apertures 8 are cut away on opposed sides, as at 9 in Fig. 5, to permit the insertion of relatively stiff spring elements 10, of arcuate cross section which terminate in inclined portions 10ª, adapted to lie upon the inclined surface 4ᵇ of the spoke terminals. 11 is a bolt and 11ª a nut, the bolt being in rigid connection with the inclined portion 10ª of the spring 10, its shank passing through the aperture 4ᶜ and terminating in the head 11ᵇ. The inner end of each spring member 10 is confined within the enlargement 9 of the aperture 8 by the rivet or double headed anchor 12 which passes through the slot 12ª in the inner end of the spring. The anchor and springs are of course inserted before the two hub plates are clamped together, and are locked in position by the securing of the hub plates.

15 is a spoke member adapted to be contained between every pair of spring members 10. It is provided with a collar or spring abutment 15ª, and its reduced portion 15ᵇ is adapted to penetrate the aperture 15ᶜ in the inner end of the spoke terminal. The inner end of the spoke member 15 is provided with a screw threaded aperture 16 into which penetrates the screw threaded portion 16ª of the spring compressing head 16ᵇ, which has the apertures 16ᶜ, whereby it may be rotated. 20 is a two part casing adapted to surround each spoke. It is slotted at the outer end as at 20ª to permit the passage of the sides 4ᵇ of the terminal 4, the apertures being provided with grease tight flaps 20ᵇ. It is secured at its inner end to one of the hub plates or to the spring members as at 21 and its outer end preferably surrounds the outer ends 10ª of the spring elements. 22 is a coil spring compressed between the collar 15ª on the spoke member 15, and the head 16ᵇ.

In assembling the spoke, the opposed spring guides 10 are inserted in the arcuate apertures 9 of the inner hub cylinder. They are anchored, as shown in Figs. 4 and 5 by the rivets 12 and the spoke member 15 is slipped into place between them, with the head 16ᵇ screw threaded into the inner end of the spoke member and holding the spring 22 tightly compressed, as shown in the right hand spoke of Fig. 4. The outer ends of the springs 10 are secured in sliding relation with the inclined surfaces of the spoke terminal 4, the casing 20 being enlarged to permit the sliding movement of the spring guides which accompanies their outward movement in relation to said inclined surfaces. The head 16^b is then released from the end of the spoke member, any suitable tool being inserted into the radial apertures therein, to unscrew it, and it is then seated by the expansion of the spring 22 against the conic inner end 8^a of the aperture 8 in the hub. The outer end of the spoke member is forced by the spring into the aperture 15^c in the inner end of the spoke terminal. This disposition of parts is shown in the left hand spoke of Fig. 4.

When each spring, 22 has been released and when the two hub plates have been finally secured together the wheel is ready for use. The spring 22 is compressed between the collar 15^a on the plunger, and the cap 16^b seated against the surface 8^a. When the weight of the running gear and load of the vehicle presses the hub down, the spring 22 is sufficiently resilient and powerful to permit the outward movement and to limit it. The spring is contained between the axial guides 15 and the opposed arcuate leaf spring guides 10. These last mentioned guides, when the hub moves down towards the rim, slide slightly in response to their movement in relation to the spoke terminal 4. It will be understood that the outwardly and divergently inclined outer ends of these spring guides slide along the inclined side surfaces of the terminal to which they are slidably secured by the bolts 11. This spreading of these guides prevents any clamping or cramping of the spring 22 between the guide rod and the spring guides. The resilience of the springs 10 is such as to provide a degree of circumferential yield. The spoke terminal 4 may itself be made, if desired, of powerful spring stock and has a degree of resilience which not only adds to the resilience of the wheel as a whole, but makes cramping and breakage of any of the parts less likely. The casing 20 surrounds all the moving parts and may, if desired, be employed as a grease or lubricant container. The apertures 20^a are sufficiently large to provide a clearance for any normal movement of the parts, and any suitable packing or flap may be provided to prevent the escape of the lubricant.

The result is an efficient spring spoke assembly, which gives a sufficient spring action, which contains no parts likely to be cramped, unduly strained, or broken. Ample clearance for the spring is provided, and pressure upon the spring and wheel instead of tending to cramp the spring action, increases the clearance.

It will be realized that while I have illustrated a working device, many changes may be made in the size, shape, number and disposition of parts, without departing from the spirit of my invention, and I wish the specification and drawings to be taken as in a broad sense diagrammatical.

I claim:

1. A wheel comprising a hub and a rim, a series of spoke members intermediate said rim and hub, a spring surrounding each said spoke member and adapted to be compressed by the movement of the hub toward the portion of the rim adjacent said spoke members, and a flexible guide about said spring connecting at one end with said hub.

2. A wheel comprising a hub and a rim, a series of spoke members intermediate said rim and hub, a spring surrounding each said spoke member and adapted to be compressed by the movement of the hub toward the portion of the rim adjacent said spoke members, and a flexible guide about said spring connecting at one end with said hub, comprising a pair of relatively stiff leaf springs.

3. A wheel comprising a hub and a rim, a series of spoke members intermediate said rim and hub, a spring surrounding each said spoke member and adapted to be compressed by the movement of the hub toward the portion of the rim adjacent said spoke members, a flexible guide about said spring and a sliding connection between the outer end of said guide and the rim.

4. A wheel comprising a hub and a rim, a series of spoke members intermediate said rim and hub, a spring surrounding each said spoke member and adapted to be compressed by the movement of the hub toward the portion of the rim adjacent said spoke members, a flexible guide about each spoke member, comprising a pair of relatively stiff leaf springs and a sliding connection between the outer ends of said leaf springs and the rim.

5. A wheel comprising a hub provided with a plurality of substantially radial apertures, spoke members loosely mounted therein, yielding supporting means intermediate said spoke members and said hub, separated opposed guide elements for each spoke member projecting beyond the apertures in said hub, each guide element having an independent connection with the wheel rim.

6. A wheel comprising a hub provided with a plurality of substantially radial apertures, spoke members loosely mounted therein, yielding supporting means intermediate said spoke members and said hub, a pair of opposed, flexible guide elements projecting beyond each aperture in said hub, and a sliding connection between the outer ends of said guide elements and the wheel rim.

7. A wheel comprising a rim and a hub, a series of spoke members connecting said rim and hub, a series of hollow guides about said spoke members, said guides being aligned with apertures in said hub, said guides being laterally flexible, and a spring surrounding each spoke member and contained within said guides, and adapted to be compressed between said rim and said hub.

8. A wheel comprising a rim and a hub and a plurality of spokes intermediate said rim and hub, each spoke comprising an inclined sided member secured to the rim and a guide rod extending from said member toward the hub, said hub being provided with an aperture adapted to receive the inner end of said guide rod, a coil spring about said guide rod, adapted to be compressed between the rim and the hub, flexible guides therefor, secured at the inner end to the hub and slidably secured at the outer end to the inclined sides of the inclined sided member.

9. A wheel comprising a rim and a hub and a plurality of spokes intermediate said rim and hub, each spoke comprising in part a spiral spring adapted to be compressed between the rim and the hub, an external resilient guide for said spring, and means for laterally expanding said external guide in response to pressure along the axis of the spoke.

10. A wheel comprising a rim and a hub and a plurality of spokes intermediate said rim and hub, each spoke comprising in part a spiral spring adapted to be compressed between the rim and the hub, an external guide for said spring, and means for laterally expanding said external guide in response to pressure along the axis of the spoke, comprising inclined surfaced portions at the outer end of said guide and opposed inclined surfaced members upon the rim, in sliding relation therewith.

Signed at Chicago, county of Cook and State of Illinois, this 16th day of May, 1923.

JOHN R. EAID.